Feb. 6, 1945.　　　　J. C. ROSE　　　　2,368,781
STUDIO SPOT LAMP
Filed Feb. 3, 1941　　　2 Sheets-Sheet 1
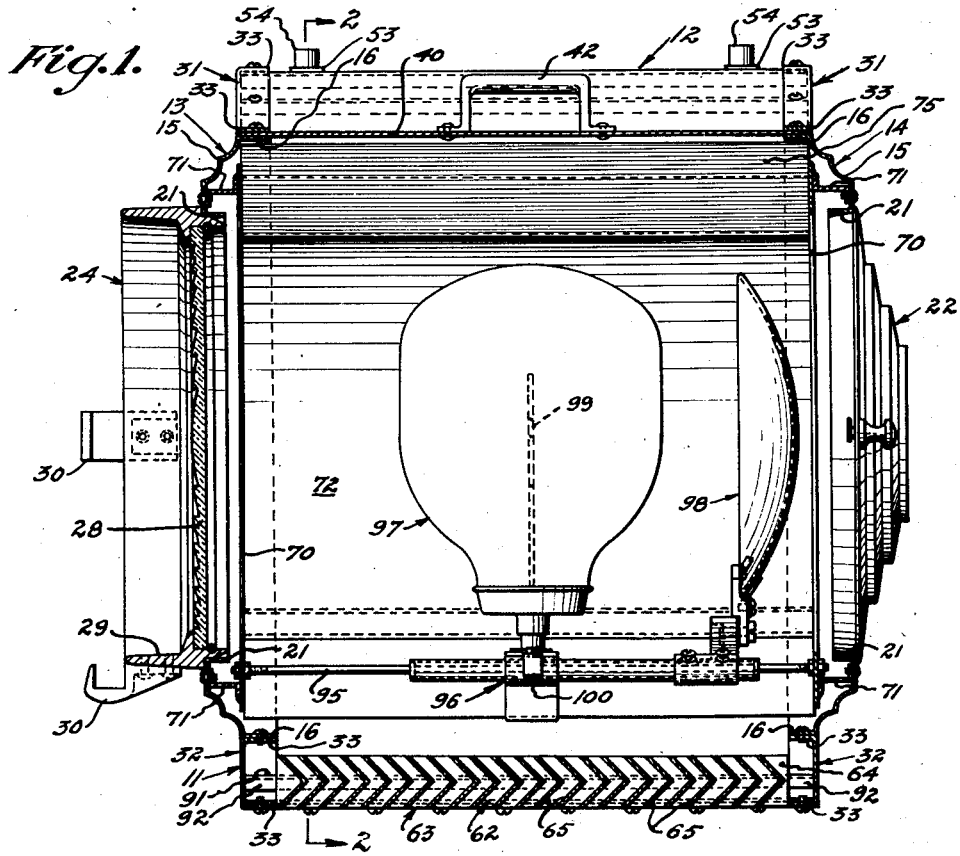
Fig. 1.
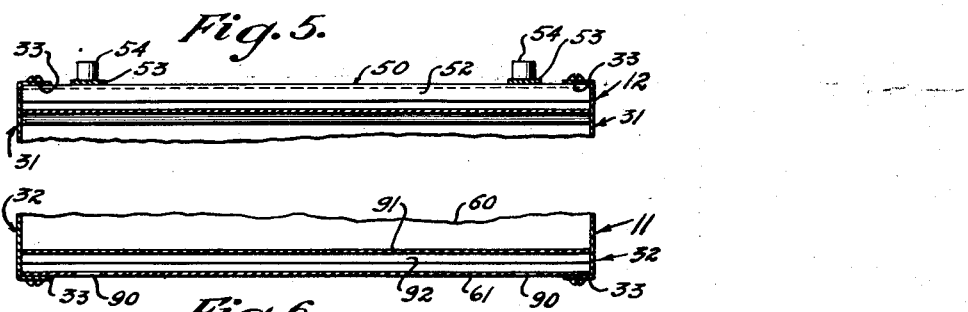
Fig. 5.
Fig. 6.
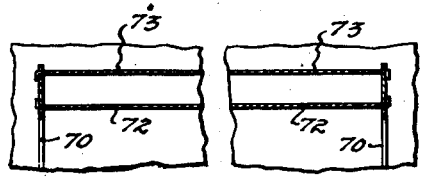
Fig. 7.
Inventor.
Jess C. Rose.
Attorneys.

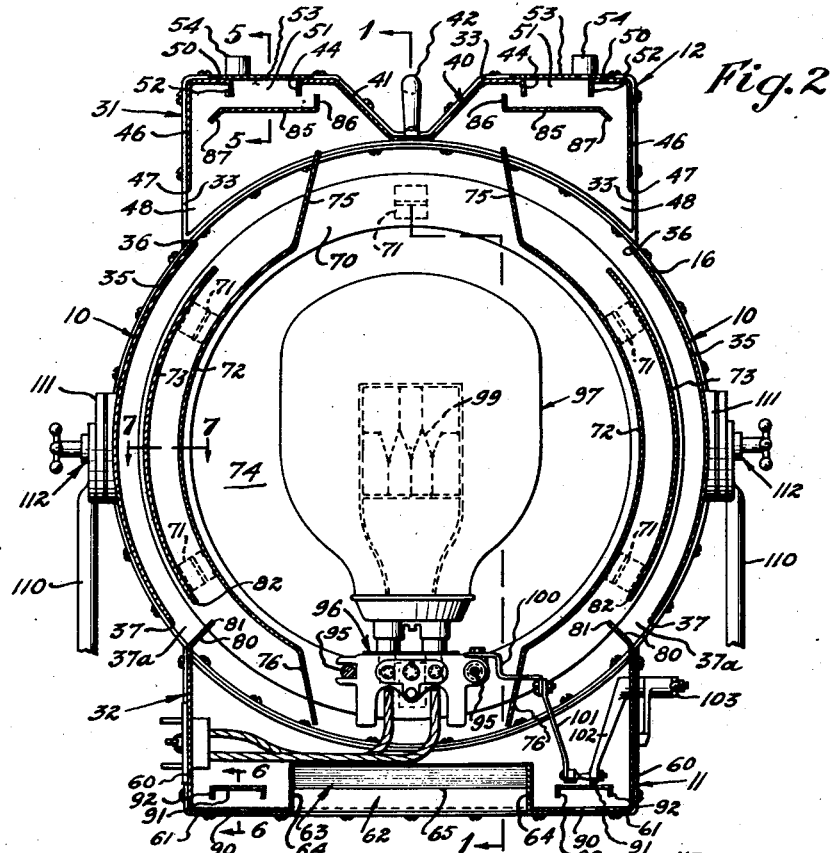
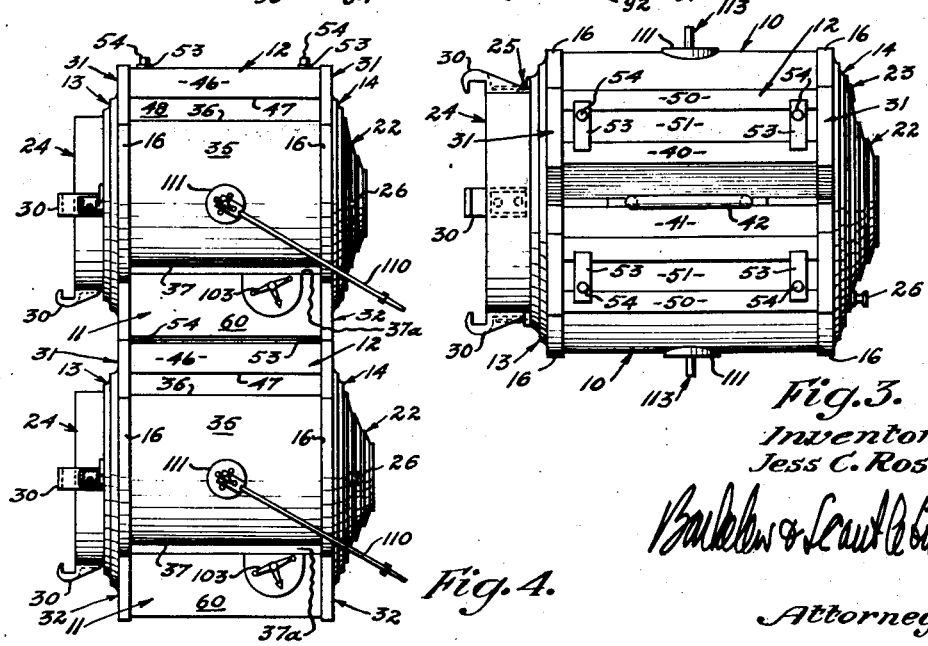

Patented Feb. 6, 1945

2,368,781

UNITED STATES PATENT OFFICE 2,368,781

STUDIO SPOT LAMP

Jess C. Rose, Los Angeles, Calif., assignor to Bardwell & McAlister, Inc., Los Angeles, Calif., a corporation of California Application February 3, 1941, Serial No. 377,153

1 Claim. (Cl. 220—97)

This invention relates generally to studio spot lamps such as are used in motion picture studios for illumination of sets.

As commonly constructed these lamps have a generally cylindric outside casing, surmounted by a relatively narrow longitudinally extending chimney structure, and having a housing structure at the bottom for enclosure of the guide rods on which the incandescent lamp carriage is mounted, as well as of the usual focusing mechanism. The chimney structure at the top may comprise an arcuate plate overlying or covering over a space between the upper edges of two approximately semicylindric side wall members, the structure being designed to permit circulation of heated air out through the top.

Motion picture studios own large numbers of such lamps, and may employ as many as two hundred of them in lighting a set. The problems of storing these lamps when not in use, and of trucking them between storage room and set, are relatively heavy, since the conventional construction prohibits their being stacked one on another, and only a limited number of them can be carried by an ordinary truck. A given truck may have only sufficient capacity to carry say six of such lamps, whereas if they could be stacked one on another, as many as twenty-four lamps could easily be carried by the same truck.

It is therefore one object of the present invention to provide a type of studio lamp of such design as to permit stacking of a number of such lamps in a vertical pile.

Another problem in motion picture studio lamp design concerns the provision of a structure which may be used under conditions of rainfall (natural or artificial) without the down-pouring water getting inside the lamp through the ventilation openings in the top. Another problem is the provision of ventilation openings and passages of such size and arrangement as to keep the lamp relatively cool during prolonged use. Still another problem is the provision of suitable light traps at all ventilation openings, such as will guard against stray light escaping from the lamp housing, since stray light on a set interferes seriously with proper photography.

Further objects of the invention are therefore to provide an improved lamp structure which has ventilation provision conducive to lower operating temperature, to provide a lamp structure of such design as to guard against incoming water when the lamp is used in the rain, and to provide a lamp structure provided with effective light trap provisions at all ventilator openings.

The lamp of the present invention will be best understood from the following detailed description of a present preferred embodiment thereof, reference for this purpose being had to the accompanying drawings, in which:

Fig. 1 is a longitudinal section taken on broken line 1—1 of Fig. 2;

Fig. 2 is a transverse section taken on line 2—2 of Fig. 1;

Fig. 3 is a plan view of the lamp;

Fig. 4 shows two of the lamps stacked one on the other;

Fig. 5 is a detail section taken as indicated by lines 5—5 of Fig. 2;

Fig. 6 is a detail section taken on line 6—6 of Fig. 2; and

Fig. 7 is a detail section taken on line 7—7 of Fig. 2.

The lamp of the present invention has cylindric side wall sections 10, a broad, flat-bottomed rectangular structure 11 at the bottom, and a broad, flat-topped rectangular chimney structure 12 at the top, all of which extend longitudinally between front and rear end frames generally designated by numerals 13 and 14, respectively. The flat top of the lamp is sufficiently broad to serve as an effective carrying platform for the equally broad flat bottom of another similar lamp, so that a number of the lamps may be stacked one on the other without liability of the stack toppling over. For this purpose, both the bottom and the top of the lamp should preferably be at least half the full width of the lamp, and ideally, and as here illustratively shown, are of widths about 70 or 75% of the full width of the lamp. A stack of four such lamps is quite stable, and unlikely to fall even during transportation in a truck.

Each of end frames 13 and 14 is here shown to embody a round central member 15, preferably formed by spinning, and provided with a marginal flange 16 in which are received the cylindric side wall members of the lamp, as later to be described. Each of members 15 also has an inwardly turned flange 21 defining a circular opening for a hinged door. A rear door 22 is receivable inside the rear door opening, being hinged at 23 on rear end frame 14. A front door 24 is receivable inside the front door opening, being hinged at 25 on front end frame 13. These doors may be of any suitable construction, not necessary here to describe in detail. It may be mentioned, however, that the rear door 22 is equipped with a manual knob 26, and will preferably be provided with any suitable type of latching mechanism, not here detailed. And front door 24 is equipped with the usual lens 28, preferably and here shown as the Fresnel type, and may have a somewhat forwardly projecting annular flange part 29 equipped with usual diffuser brackets 30.

End frames 13 and 14 also include extension castings 31 and 32 mounted on the top and bottom sides of the round central members 15, castings 31 and 32 having marginal inwardly turned flanges 33, and being secured to members 15 as by suitable screws passing through their engaging flanges, as will be understood from an inspection of Figs. 1 and 2.

The previously mentioned cylindric sides 10 of the lamp, as here embodied, consist of arcuate or cylindric sheet metal walls 35 received inside and secured to the flanges 16 of end frame members 15. The upper edges 36 of these cylindric side walls 35 are located at the intersection of the cylindric sides of the lamp with the vertical sides of the rectangular top structure 12, as clearly appears in Fig. 2, while the lower edges 37 of side walls 35 are spaced a short distance above the intersection of the cylindric sides of the lamp with the vertical sides of the rectangular bottom structure 11, all as clearly illustrated in Fig. 2.

Top structure 12 includes a central, longitudinally extending sheet metal member 40, received inside and suitably secured to flanges 33 of end frame members 31 and this top member 40 is preferably formed with a V-shaped longitudinally extending depression 41, which provides a recess for the accommodation of a suitable handle 42 that is secured to member 41 at the bottom of the depression, this handle being confined entirely below the top plane of top structure 12. The carrying handle 42 for the lamp is thus accommodated in a pocket sunk in the top surface of top structure 12, so that interference between said handle and any lamp stacked on top structure 12 is avoided. The end frame members 31 conform to the V-shaped depression in top member 14, as will be evident from an inspection of Fig. 2. The two longitudinal edges of top member 41 are provided with short depending flanges 44, for a purpose that will appear later.

Top structure 12 has side wall members 46, extending between end frame members 31 and received inside and secured to flanges 33, the lower edges 47 of said members 46 terminating above the upper edges 36 of the aforementioned cylindric side wall members 35, so as to provide longitudinally extending air circulation spaces 48 between the edges 36 and 47. Side wall members 46 are turned inwardly at the top, to form top portions 50, and the latter terminate substantially short of the longitudinal edges of top member 40, so as to leave longitudinally extending air circulation apertures 51 of considerable width in the top of the lamp, in positions substantially offset from the center line of the lamp, as illustrated in Fig. 2. The edges of members 50 are formed with downwardly turned flanges 52. Straps 53 mounted on top members 40 and 50, and bridging across the space 51 (see Figs. 2 and 3) are provided with upstanding positioning lugs 54, which are adapted to be received in corresponding apertures formed in the bottom of a similar lamp when the lamps are stacked, as later to be more fully described. There are four of these straps 53, and four of the positioning lugs 54, near the four corners of the rectangular top structure 12, as clearly shown in Fig. 3.

The rectangular bottom structure 11 of the lamp includes integral side and bottom wall members 60 and 61, which extend between end frame members 32 and are received inside and secured to the flanges 33 of the latter. The inner edges of bottom members 61 define a relatively wide air inlet aperture 62, extending the length of the lamp. Fitted in this aperture is a light-trap structure 63, which comprises vertical side walls 64 secured to the edges of bottom members 61, and transverse chevron-shaped light baffles 65 extending between walls 64. The baffles 65 are relatively closely spaced, so as to prevent any light escaping downwardly through the bottom of the lamp, while at the same time affording passageways for free circulation of air upwardly into the interior of the lamp.

Baffle supporting rings 70 are mounted inside the lamp, as on brackets 71 secured to circular end frame members 15, and secured, as by welding, to the rings 70 are pairs of cylindric annularly spaced baffle plates 72 and 73, arranged concentrically with and at annular spacing inside cylindric side walls 35. The baffle plates 72, which are on opposite sides of and serve to define the interior lamp chamber 74, are separated at the top by upwardly and somewhat inwardly inclined baffle extensions 75 that serve to define a flue, and are separated at the bottom by downwardly and somewhat inwardly inclined baffle extensions 76 between which cooling air is drawn in. The baffles 73 are spaced midway between baffles 72 and side walls 35, as shown.

Extending inwardly and upwardly from the upper edges of side wall members 60 are deflector flanges 80, the upper edges 81 of which are spaced inwardly of the lower edges 82 of baffles 73, for a purpose presently to be explained.

Below the longitudinal apertures 51 in the top of the lamp, and extending beyond the flanges 44 and 52 defining said apertures, are horizontal baffle plates 85. These plates extend the full length of the lamp, and are secured at the ends, as by welding, to end frame members 31. The inner longitudinal edges of these plates 85 are formed with upstanding flanges 86, which as shown rise to the level of the lower edges of flanges 44 and 52, and which are spaced inwardly of the flanges 44, so as to provide an air circulation space outwardly between said flanges. The outer edges of the plates 85 are formed, beyond flanges 52, with downwardly inclined flanges 87. The formation is such as to prevent any light from escaping from the lamp through apertures 51.

The two bottom wall members 61 of the lamp are provided with four apertures 90, in line with the lugs 54 at the top, and adapted to receive similar lugs of another lamp as the lamps are stacked. Positioned over these apertures 90 are longitudinally extending light baffle plates 91, having downturned flanges 92 along their longitudinal edges, also designed to prevent escape of light from the lamp.

A pair of longitudinal guide rods 95 are mounted on and extend between the two supporting rings 70 at the bottom of the lamp, and slidable on these rods 95 is a lamp carriage 96, of any suitable or conventional type, adapted to carry the usual incandescent light globe 97. Carriage 96 also supports a small spherical reflector 98 to the rear of light globe 97, the reflector 98 being designed to receive light from the filament 99 of globe 97 and to reflect it back to a focus in the plane of the filament 99. The lamp carriage 96, globe 97 and reflector 98 may be of conventional types and will require no detailed consideration herein. Figure 2 shows a focusing mechanism suitable for sliding carriage 96 along guide rods 95, and comprising a bracket arm 100 extending from carriage 96, a link 101 pivotally connected to arm 100, a crank 102 pivotally connected to link 101 and mounted for rotation on side wall 60, and an exterior operating handle 103. Such a focusing mechanism is described and claimed in my prior Patent Re. 21,089, issued May 16, 1939. It will be understood that rotation of handle 103 will operate crank arm 102 and link 101 to slide lamp carriage 96 longitudinally on guide rods 95, thus adjusting the position of globe 97 with reference to the lens 28 of the lamp, so as to adjust the focus.

Numeral 110 indicates the usual supporting yoke, the two side wall members 35 of the lamp carrying mounting plates 111 to which the arms of the yoke are trunnioned in a conventional manner, as indicated at 112. This yoke has a pin 113 (see Fig. 3) adapted to be removably inserted in a usual stand, not shown. The yokes are shown in Fig. 4 as swung to the side to permit stacking of the lamps.

In the operation of the lamp, a great deal of heat is generated by the globe 97. This heat is rapidly dissipated by the baffling and ventilation system provided by the construction as described. The heated air rises from the globe 97 through the flue defined by the baffle members 75, and leaves the lamp at the top through longitudinal openings 51 by way of the two passages defined by the pairs of cooperating flanges 86 and 44, and 87 and 52. At the same time, cool air is being drawn into the lamp through the passageways 62 between the baffle members 65 at the bottom of the lamp, this cool air rising into the interior of the lamp chamber 74 between the baffle members 76, where it is heated and escapes as above described. The baffle members 72 tend to become heated, and are cooled by circulation of air entering the bottom of the lamp and passing around the outside of the members 72. Further cooling is accomplished by air entering in the spaces 37a between the lower edges of side wall members 35 and flange 80, the latter air rising on both sides of the baffles 73, part of it escaping through openings 48, and part of it rising to the top and escaping through openings 51. The described circulations of air from the opening in the bottom of the lamp both through the central lamp chamber and around the baffles 72 to the openings 51 at the top of the lamp, and the circulation of air inwardly through the openings at 37a, upwardly on both sides of baffle 73, and out through openings 48 and 51, remove the heat from the lamp as fast as generated, and cause the lamp to operate at an exceptionally low temperature.

All ventilation openings are equipped with light traps, preventing escape of light from the sides, top or bottom of the lamp. Moreover, the arrangement of ventilation openings and baffles is such as to exclude water from the interior chamber 74 of the lamp even when the lamp is used under heavy down-fall of water. Any water entering the long apertures 51 in the top of the lamp is caught by the members 85 and is shed off the outer edges thereof over the flanges 87, being thus prevented from falling inside the baffle members 75 and so into chamber 74. The edges of flanges 87 being outside the upper edges of the baffles 73, the water falling from flanges 87 is caught by and passes outside the baffles 73, to finally leave the lamp via openings 37a, the flanges 80 keeping the water from going on down into the bottom of the lamp, as will be evident.

Fig. 4 shows how the lamps of the present invention may be stacked for storage or transportation, the broad, flat bottom of the upper lamp being supported by the broad flat top of the lamp below, with the upstanding positioning lugs 54 of the bottom lamp received in the corresponding apertures 90 in the bottom of the lamp above. In the present design, it is of course actually the flange portions 33 at the top and bottom of the end frames 13 and 14 of the two lamps that come into supporting engagement when the lamps are stacked, as will be understood from inspection of Fig. 4.

The lamp of the present invention thus has the novel characteristic that it is designed for stacking—a feature of utmost advantage under present motion picture studio practices. It has the further feature of improved ventilation, and therefore lower operating temperature. Combined with this latter feature is the provision of a rain excluding design, and the provision of effective light traps at all ventilation openings.

A present preferred embodiment of the invention has now been described; it is to be understood, however, that this is for illustrative purposes only, and that various changes in design, structure and arrangement may be made without departing from the spirit and scope of the present invention or of the appended claim.

I claim:

In a lamp housing, the combination of front and rear end frames, cylindrical sheet metal side wall members extending between said end frames defining opposite sides of the lamp housing, a relatively broad substantially rectangular sheet metal top structure rising above the upper edges of said side wall members and secured to and extending between said end frames, and a relatively broad substantially rectangular sheet metal bottom structure extending downwardly below the lower edges of said side wall members and secured to and extending between said end frames, said top and bottom structure being of widths approximately three-quarters the width of the lamp as measured between said cylindric side wall members, and being flat on the top and on the bottom, respectively.

JESS C. ROSE.